United States Patent Office 2,831,795
Patented Apr. 22, 1958

2,831,795
PRACTICE FOR THE RAISING AND PROTECTION OF ANIMALS

Theo A. Hymas, Midland, Mich., assignor to The Dow Chemical Company, Midland, Mich., a corporation of Delaware No Drawing. Application February 16, 1955
Serial No. 488,714

5 Claims. (Cl. 167—53.1)

This invention relates to animal husbandry and is particularly concerned with a method and composition for the control of gastro-intestinal parasites.

Domestic animals are subject to attack by a number of different gastro-intestinal parasites. Certain of these parasites are minute protozoan organisms known as coccidia. These protozoan organisms are the causative agents of coccidiosis which is a particularly prevalent and destructive disease of fowl such as chickens, geese and turkeys. The disease is also found in dogs, calves, lambs, pigs and other domesticated animals.

A number of remedies have been proposed for the control of gastro-intestinal parasites. Their administration often has been through the water or feed for the animals. Many of these materials have been of little efficacy, while others have been too expensive or too toxic for prophylactic administration. One of the difficulties encountered in their use has been the poisoning of the hemopoietic system and a subsequent reduction in the number of red and white blood cells in the body. Another difficulty has been the adverse effect which certain of the materials have upon the animals in retarding growth. These effects have made the use of many remedies hazardous and unprofitable.

It is an object of the present invention to provide a new and improved practice for raising and benefiting domesticated animals and fowl. A further object is to provide a method for the control of gastro-intestinal parasites in animals. An additional object is the provision of a novel method for the control of coccidiosis. Another object is to provide a new method for the control of parasitic diseases of the gastro-intestinal tract of animals. A further object is the provision of a method which may be employed prophylactically without adversely affecting the metabolic activity or blood-forming organs of the animals. Yet another object is the provision of novel feed compositions adapted to be employed in the new practice for raising and benefiting animals. Other objects will become apparent from the following specification and claims.

The new method of benefiting animals comprises dosing animals with 6,8-dinitro-2,4(1H,3H)-quinazolinedione of the formula

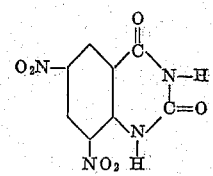

to protect them from parasitic disease of the intestinal tract and particularly from coccidiosis. The quinazolinedione compound is a crystalline solid and inexpensive to prepare. It is not repellent to animals and preferably may be employed in admixture with animal feed. It may be administered continuously or intermittently in dosages sufficient to control gastro-intestinal parasites without adversely affecting the metabolic activity or blood-forming organs of the fowl, or imparting any unpalatable characteristics to animal flesh.

The oral administration or feeding of an effective dosage of the quinazolinedione compound is essential and critical for the practice of the present invention. In general, good results are obtained when the animals are fed a daily dosage of from 100 to 2000 milligrams of the quinazolinedione compound per kilogram of body weight. Where prophylactic treatment is desired and the compounds are fed continuously, daily dosages of from 100 to 600 milligrams per kilogram of body weight have been found satisfactory. Where danger of reinfestation from contaminated feed or surroundings is low, good controls are obtained when the animals are fed a daily dosage of 1500 milligrams or more per kilogram of body weight for a period of from 2 to 5 days, but preferably not for a longer period.

The method of the present invention may be carried out by the oral administration or feeding of the unmodified quinazolinedione compound. However, the present invention also embraces the employment of a liquid, powder, mash, pellet or other animal feed composition containing the compound. In such usage, the compound may be modified with one or more of a plurality of additaments or innocuous ingestible adjuvants including water, ethanol, skim milk, syrups, edible oils or other liquid carriers; surface-active dispersing agents such as the liquid and solid emulsifying agents; and edible solid carriers such as edible powders and commercial animal feeds, concentrates or supplements. Such augmented compositions are adapted to be fed animals to supply the desired dosage of active agent or to be employed as concentrates and subsequently diluted with additional carrier to produce the ultimate compositions.

The exact concentration of the quinazolinedione compound to be employed in the compositions may vary provided that sufficient of the composition is ingested by the animal so as to provide the required dosage of active agent. For example, where direct administration to an individual animal is preferred, liquid or solid compositions containing from 5 to 95 percent by weight of the agent may be employed to supply the desired dosage. Where the compound is provided as a constituent of the principal food ration, satisfactory results are obtained with food rations containing a minor but effective amount of the quinazolinedione compound. The exact amount of the compound in the ration is dependent upon the food consumption and feeding habits of the animals concerned. In fowl, the required dosages may be supplied with mash compositions containing from 0.05 to 0.3 percent by weight of the active agent. Where the compound is furnished in the drinking water, good results are obtained at concentrations of the agent in the water equal to one-half those employed when the compound is supplied as a constituent in the principal food ration. In compositions to be employed as concentrates the active agent may be present in a concentration of from 5 to 95 percent by weight.

Liquid compositions containing the desired amount of the quinazolinedione compound may be prepared by dispersing the compound in ethanol or an edible oil, or by dispersing it in water with the aid of a suitable surface-active dispersing agent such as an ionic or non-ionic emulsifying agent. Suitable surface-active dispersing agents include the glycerol and sorbitan esters of fatty acids and the polyoxyalkylene derivatives of fatty alcohols and of sorbitan esters.

In the preparation of solid feed compositions the quinazolinedione compound may be mechanically ground with an edible solid such as oyster shell flour or a solid surface-active dispersing agent such as finely-divided bentonite, fuller's earth or attapulgite. These compositions may be administered in the form of capsules or tablets or dispersed in an animal feed and such feed used to supply a part or the entire ration. Alternatively, the quinazolinedione compound may be dispersed in an organic solvent such as alcohol, or acetone, the resulting mixture dispersed in an animal feed and the feed dried to remove the solvent. Also, the compound may be dispersed in an edible oil such as coconut oil, olive, cotton seed or pea nut oil, and the resulting mixture dispersed in the feed. This edible oil composition may contain one of the aforementioned emulsifying materials as a dispersing agent.

The following examples illustrate the invention but are not to be construed as limiting:

Example 1

Twenty-five parts by weight of 6,8-dinitro-2,4-(1H,3H)-quinazolinedione was ground with 75 parts of fuller's earth to prepare a composition which is adapted to be fed to animals or employed as a dispersible concentrate. A portion of this composition was dispersed in a commercial poultry starting mash to produce a medicated feed composition containing 0.2 percent by weight of the quinazolinedione compound.

This medicated feed composition and unmodified starting mash were fed as a sole ration to groups of chickens of the same history. Each such test group consisted of three birds which were ten days old. Twenty-four hours after the initiation of the diets, 30,000 sporulated *Eimeria necatrix* oöcysts were introduced directly into the crop of each bird. At the time of the initiation of the diets, and upon the fifth and seventh days thereafter, the birds were weighed and the average weight per bird for each test group determined. During the interval between the fifth and seventh days, coccidial infection generally causes maximum disturbances in the rate of growth of fowl. Another group of birds was left untreated and uninoculated to serve as an uninfected check. On the seventh day the inoculated birds were sacrificed and autopsied. An examination of each bird was made to determine the presence and severity of coccidial disease as evidenced by the presence and extent of cecal and intestinal lesions. The average weight per bird at the aforementioned intervals and the autopsy findings for the test groups are set forth in the following table:

| Percent by Weight of Active Agent In Mash | Average Weight per Bird in Grams at the Indicated Intervals Following the Initiation of the Diets | | | Autopsy Finding |
|---|---|---|---|---|
| | 0 Days | 5 Days | 7 Days | |
| 0.2 | 128 | 190 | 217 | No coccidial disease. |
| none (inoculated checks). | 128 | 192 | 188 | All Birds heavily infected with coccidial disease. |
| none (uninoculated checks). | 131 | 196 | 222 | |

Example 2

Ninety parts by weight of 6,8-dinitro-2,4(1H,3H)-quinazolinedione is mechanically ground with 10 parts of bentonite to produce a parasiticidal concentrate.

In a further operation, 20 parts by weight of 6,8-dinitro-2,4(1H,3H)-quinazolinedione is mechanically mixed with 80 parts of soybean meal to prepare an animal feed concentrate.

In another operation, a medicated feed supplement is prepared by grinding together 50 parts by weight of 6,8-dinitro-2,4(1H,3H)-quinazolinedione, 1 part of a sorbitan monopalmitate (Spann 20) and 49 parts of aluminum magnesium silicate (attapulgite).

Also, 10 parts by weight of 6,8-dinitro-2,4-(1H,3H)-quinazolinedione is dispersed in 90 parts of cotton seed oil to prepare a concentrate composition in the form of an edible oil.

These compositions are adapted to be administered to animals to supply the desired dosage of the quinazolinedione compound or to be employed as concentrates and subsequently diluted with additional edible carrier to produce animal feeds containing the desired amount of active agent.

Example 3

A portion of the concentrate composition of Example 1 was dispersed in a commercial poultry starting mash to prepare medicated feed compositions containing 0.15 and 0.2 percent by weight of quinazolinedione compound. These medicated feed compositions were tested with unmodified mash in a manner similar to that described in Example 1. In such operations, each test group consisted of 10 birds and the birds were inoculated with 25,000 sporulated *Eimeria necatrix* oöcysts. The average weight per bird and the autopsy findings for the test groups are set forth in the following table:

| Percent by Weight of Active Agent In Mash | Average Weight per Bird in Grams at the Indicated Intervals Following the Initiation of the Diets | | | Autopsy Finding |
|---|---|---|---|---|
| | 0 Days | 5 Days | 7 Days | |
| 0.15 | 121 | 172 | 192 | Trace of coccidial infection in two birds. |
| 0.2 | 120 | 175 | 201 | No coccidial disease. |
| none (inoculated checks). | 119 | 169 | 156 | All birds heavily infected with coccidial disease. |
| none (uninoculated checks). | 117.8 | 173 | 194 | |

Example 4

A medicated feed composition containing 0.1 percent by weight of quinazolinedione compound is prepared in the manner as described in Example 1. This medicated feed composition and unmodified starting mash are fed as a sole ration to groups of chickens of the same history and past environment. Each such test group consists of ten birds which are ten days old. Forty-eight hours after the initiation of the diets, 30,000 sporulated *Eimeria tenella* oöcysts are introduced directly into the crop of each bird. Upon the seventh day following the initiation of the diets, the birds are sacrificed and autopsied. An examination of each bird is made to determine the presence and severity of coccidial disease as evidenced by the presence and extent of cecal and intestinal lesions. From the examination it is found that the birds receiving the medicated diet show no evidence of coccidial disease while the birds receiving the unmodified diet are all heavily infected with coccidiosis.

I claim:

1. An animal feed supplement containing from 5 to 95 percent by weight of 6,8-dinitro-2,4(1H,3H)-quinazolinedione.

2. A concentrate composition comprising from 5 to 95 percent by weight of 6,8-dinitro-2,4(1H,3H)-quinazolinedione in intimate admixture with an edible finely-divided solid.

3. An animal feed containing a minor and parasiticidal concentration of 6,8-dinitro-2,4(1H,3H)-quinazolinedione.

4. A poultry mash containing from 0.05 to 0.3 percent by weight of 6,8-dinitro-2,4(1H,3H)-quinazolinedione.

5. In the practice of animal husbandry, the method which comprises incorporating into the food consumed by animals an amount of 6,8-dinitro-2,4(1H,3H)-quinazolinedione sufficient to control gastro-intestinal parasites.

References Cited in the file of this patent

Chemical Abstracts 46, 7104 i, 1952.